US010752207B2

(12) United States Patent
Zeryihun et al.

(10) Patent No.: US 10,752,207 B2
(45) Date of Patent: Aug. 25, 2020

(54) MULTI-FACTOR AUTHENTICATION OF A HARDWARE ASSEMBLY

(71) Applicant: Ford Global Technologies, LLC, Dearborn, MI (US)

(72) Inventors: Amanuel Zeryihun, Pinole, CA (US); Pramita Mitra, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/125,292

(22) Filed: Sep. 7, 2018

(65) Prior Publication Data

US 2020/0079319 A1    Mar. 12, 2020

(51) Int. Cl.
| | | |
|---|---|---|
| *B60R 25/10* | (2013.01) | |
| *B60R 25/01* | (2013.01) | |
| *B60R 25/30* | (2013.01) | |
| *G06K 19/077* | (2006.01) | |
| *G06F 21/64* | (2013.01) | |
| *G06F 21/62* | (2013.01) | |
| *G06F 21/53* | (2013.01) | |

(52) U.S. Cl.
CPC ............ *B60R 25/01* (2013.01); *B60R 25/307* (2013.01); *G06F 21/53* (2013.01); *G06F 21/6209* (2013.01); *G06F 21/64* (2013.01); *G06K 19/07758* (2013.01)

(58) Field of Classification Search
CPC ....... B60R 25/01; B60R 25/307; G06F 21/53; G06F 21/6209; G06F 21/64; G06K 19/07758

USPC .................................................. 340/426.34
See application file for complete search history.

(56) References Cited

U.S. PATENT DOCUMENTS

| | | | | |
|---|---|---|---|---|
| 4,805,722 | A * | 2/1989 | Keating | ................ B60R 25/04 180/287 |
| 5,815,087 | A * | 9/1998 | Campbell | ............... B60R 25/04 307/10.2 |
| 6,741,166 | B1 * | 5/2004 | Sanchez | ............. B60R 11/0205 292/323 |
| 7,320,478 | B2 | 1/2008 | Gaboury et al. | |
| 9,813,436 | B2 | 11/2017 | Moeller et al. | |

(Continued)

FOREIGN PATENT DOCUMENTS

| | | | | |
|---|---|---|---|---|
| EP | 0887497 B1 | 3/2004 | | |
| WO | WO 9640538 A1 * | 12/1996 | ............ | B60R 21/16 |
| WO | 2013123350 A1 | 8/2013 | | |

OTHER PUBLICATIONS

EBV Elektronic, An Avnet Company, "Security Selection Guide", Version 2, Oct. 2017 (50 pages).

(Continued)

*Primary Examiner* — Kerri L McNally
*Assistant Examiner* — Thang D Tran
(74) *Attorney, Agent, or Firm* — Brandon Hicks; Bejin Bieneman PLC (57) ABSTRACT

A system is disclosed that performs multi-factor authentication with respect to a hardware assembly. In one example, a method includes: storing a cryptographic identifier of a vehicle hardware assembly; transmitting, to the assembly, a validation message; receiving a response message; decrypting the response message using the identifier; and determining whether the assembly is authenticated.

20 Claims, 2 Drawing Sheets

(56) References Cited

U.S. PATENT DOCUMENTS

| | | | |
|---|---|---|---|
| 2002/0194476 A1* | 12/2002 | Lewis | H04L 9/3271 713/169 |
| 2004/0003252 A1* | 1/2004 | Dabbish | B60R 25/04 713/175 |
| 2005/0024190 A1* | 2/2005 | Edens | B60R 11/02 340/426.1 |
| 2008/0034216 A1* | 2/2008 | Law | H04L 9/3273 713/183 |
| 2009/0313473 A1* | 12/2009 | Walker | G06F 21/725 713/175 |
| 2013/0041558 A1* | 2/2013 | Westra | G06F 21/44 701/45 |
| 2013/0111212 A1* | 5/2013 | Baltes | G06F 21/57 713/176 |
| 2013/0251150 A1* | 9/2013 | Chassagne | G01S 1/042 380/270 |
| 2013/0332007 A1* | 12/2013 | Louboutin | H04W 4/021 701/2 |
| 2014/0090280 A1* | 4/2014 | Cunningham | B60R 25/104 40/201 |
| 2014/0189807 A1* | 7/2014 | Cahill | G06F 21/41 726/4 |
| 2014/0337979 A1* | 11/2014 | Pereira | G06F 21/566 726/23 |
| 2015/0089236 A1* | 3/2015 | Han | H04L 9/3242 713/181 |
| 2015/0312764 A1* | 10/2015 | Tuukkanen | H04W 12/08 455/411 |
| 2016/0117521 A1* | 4/2016 | Spalka | G06F 21/6227 713/171 |
| 2016/0189440 A1* | 6/2016 | Cattone | G07C 5/008 701/31.5 |
| 2016/0205530 A1* | 7/2016 | Tsai | H04W 8/005 455/41.2 |
| 2017/0267192 A1* | 9/2017 | Chen | B60R 16/0234 |
| 2018/0012311 A1* | 1/2018 | Small | B33Y 50/02 |
| 2018/0012433 A1* | 1/2018 | Ricci | B60L 53/65 |
| 2018/0075527 A1* | 3/2018 | Nagla | G06F 21/64 |
| 2018/0091596 A1* | 3/2018 | Alvarez | H04L 63/0428 |
| 2018/0157825 A1* | 6/2018 | Eksten | G06F 21/64 |
| 2018/0183586 A1* | 6/2018 | Bhargav-Spantzel | H04L 9/0861 |
| 2018/0189312 A1* | 7/2018 | Alas | G06F 21/64 |
| 2018/0264347 A1* | 9/2018 | Tran | G16H 50/20 |
| 2018/0270244 A1* | 9/2018 | Kumar | B64C 39/024 |
| 2018/0279119 A1* | 9/2018 | Eftimovski | H04W 12/02 |
| 2018/0367316 A1* | 12/2018 | Cheng | G06F 21/52 |
| 2018/0374283 A1* | 12/2018 | Pickover | G07C 5/085 |
| 2019/0025818 A1* | 1/2019 | Mattingly | G05D 1/0295 |
| 2019/0050810 A1* | 2/2019 | Nagalla | G06F 16/23 |
| 2019/0075102 A1* | 3/2019 | Kim | H04L 63/0853 |
| 2019/0149334 A1* | 5/2019 | Van Der Velden | H04L 9/0891 713/185 |
| 2019/0171849 A1* | 6/2019 | Assenmacher | G06F 16/9014 |
| 2019/0205547 A1* | 7/2019 | Horvath | G06F 21/36 |
| 2019/0259274 A1* | 8/2019 | Avery | G08G 1/0145 |
| 2019/0311108 A1* | 10/2019 | Achkir | H04L 9/3239 |
| 2019/0385269 A1* | 12/2019 | Zachary | G06T 1/0085 |
| 2020/0005559 A1* | 1/2020 | Grunbok, II | G06Q 10/02 |
| 2020/0014529 A1* | 1/2020 | Kanza | H04L 9/3247 |

OTHER PUBLICATIONS

Intel Security White Paper, "Automotive Security Best Practices, Recommendations for Security and Privacy in the Era of the Next-Generation Car" (17 pages).

\* cited by examiner

MULTI-FACTOR AUTHENTICATION OF A HARDWARE ASSEMBLY

BACKGROUND

Automotive vehicles increasingly come equipped with expensive modular components—e.g., such as a catalytic converter, alloy wheels, stylish tail lamp assemblies, and the like. Thieves may target these particular components and even replace them with counterfeit parts so that the vehicle owner is unaware of the theft. A system is needed to detect such theft.

DETAILED DESCRIPTION

A component validation system is described that carries out multi-factor authentication. According to one illustrative example, the system includes: a hardware assembly, comprising: a trusted execution environment (TEE); and a computer, comprising a processor programmed to execute instructions to: store a cryptographic identifier of the assembly; transmit, to the assembly, a validation message; then, receive a response message; then, decrypt the response message using the identifier; and then, authenticate the assembly.

According to the at least one example set forth above, the assembly further comprises a physical component targetable by thieves.

According to the at least one example set forth above, the TEE stores a private key.

According to the at least one example set forth above, the TEE is programmed to: digitally sign the validation message.

According to the at least one example set forth above, the identifier is a public key that corresponds with a private key stored in the TEE.

According to the at least one example set forth above, the instructions further comprise, to: query a stakeholder's system for the identifier.

According to the at least one example set forth above, the computer is a stakeholder's system associated with a blockchain, wherein the blockchain comprises a plurality of cryptographic identifiers which each uniquely identify a different hardware assembly in a vehicle.

According to the at least one example set forth above, the instructions further comprise: following authorized vehicle repair, use an updated cryptographic identifier and repeat the instructions to store, transmit, receive, decrypt, and authenticate.

According to another illustrative example, a method is described that includes: at a computer in a vehicle: storing a cryptographic identifier of a vehicle hardware assembly; transmitting, to the assembly, a validation message; then, receiving a response message; then, decrypting the response message using the identifier; and then, determining whether the assembly is authenticated.

According to the at least one example set forth above, the assembly further comprises a physical component targetable by thieves.

According to the at least one example set forth above, the TEE stores a private key.

According to the at least one example set forth above, the response message comprises a digital signature of at least a portion of the validation message.

According to the at least one example set forth above, the identifier is a public key that corresponds with a private key used to encrypt the response message.

According to the at least one example set forth above, further comprising: requesting, from a stakeholder's system, the identifier.

According to the at least one example set forth above, the stakeholder's system comprises the computer or a remote server.

According to the at least one example set forth above, further comprising repeating the decrypting using an updated cryptographic identifier.

According to the at least one example set forth above, further comprising: determining that the assembly is not authenticated; and providing an alert based on the determination.

According to the at least one example set forth above, further comprising: determining that the assembly is authenticated; and adding a block to the blockchain that records the authentication.

According to another illustrative example, a system is described that comprises: a hardware assembly, comprising: a first processor, and a trusted execution environment (TEE) within the first processor, wherein the first processor is programmed to receive a validation message, and pass the validation message to the TEE, wherein the TEE is programmed to digitally sign at least a portion of the validation message and return, to the first processor, an encrypted response message; and a computer, comprising a second processor and memory storing instructions executable by the second processor, comprising to: store a cryptographic identifier of the assembly; transmit, to the first processor, the validation message; then, determine whether a response message is received from the first processor; when the response message is received, then: decrypt the response message using the identifier; and then, determine whether the assembly is authenticated; and when the response message is not received, then: determine that the assembly is not authenticated.

According to the at least one example set forth above, the instructions further comprising to: when the assembly is not authenticated, provide an alert.

According to the at least one example, a computer is disclosed that is programmed to execute any combination of the examples of the method(s) set forth above.

According to the at least one example, a computer program product is disclosed that includes a computer readable medium that stores instructions executable by a computer processor, wherein the instructions include any combination of the examples of the method(s) set forth above.

Referring to the drawings, an illustrative component validation system 10 is disclosed that includes a stakeholder's system on blockchain 12 (hereafter, referred to simply as "stakeholder's system;" e.g., associated with a blockchain and with other stakeholder's systems (not shown)), a computer 14, and a trusted execution environment (TEE) 16 within one of a plurality of hardware assemblies 18-24 (the computer 14, TEE 16, and assemblies 18-24 each being part of a vehicle 30). In the illustrated example, the hardware assemblies 18-24 are airbag assemblies; however, this type of assembly is merely one example (and other examples exist). As will be explained more below, the computer 14 may execute a set of instructions (e.g., software, firmware, or the like) which comprise a multi-factor authentication to authenticate each the hardware assemblies 18-24. In this manner, the computer 14 may determine whether the respective assembly is counterfeit or otherwise not the hardware assembly which is cataloged to the respective vehicle 30.

Turning first to the stakeholder's system(s), stakeholder's system 12 may be a remote server comprising one or more computers 32 networked to and/or comprising one or more databases 34. In at least one example, stakeholder's system 12 utilizes a blockchain that includes an identity of the vehicle 30, as well as the identity of each of the hardware assemblies 18-24. As used herein, a blockchain is a list of records linked to one another using cryptography, wherein new blocks (e.g., comprising records (a.k.a., data)) may be added by a stakeholder's system. As used herein, a stakeholder's system is a computing system associated with an entity that has permission to add blocks to the respective blockchain. Typically, multiple stakeholder's systems are associated with a respective blockchain, and the blockchain is a technique to facilitate a secure and distributed ledger (e.g., data) therebetween. For example, in an automotive context, stakeholder's system 12 (shown in FIG. 1) may be a manufacturer of vehicle 30 or any other suitable stakeholder's system that needs to access the information contained within the respective blockchain. Other non-limiting examples of stakeholder's system 12 include a server of an automotive supplier which manufactured the hardware assemblies 18-24 and sold them to the manufacturer of vehicle 30, a server of an authorized vehicle dealership which sold vehicle 30 to a consumer (a.k.a., end user), a server of an authorized repair facility (e.g., licensed to service vehicle 30), and a server of an insurance agency which insures vehicle 30. In at least one example, the vehicle 30 is also a stakeholder's system—e.g., computer 14 may carry out instructions similar to those of computer 32 with respect to communicating via the blockchain. In this manner, e.g., a vehicle manufacturer may generate a blockchain that comprises, among other things, an identifier of the vehicle 30 (e.g., such as a vehicle identification number or VIN) and cryptographic identifiers of each of the hardware assemblies 18-24 (e.g., such as a model number and/or unique serial numbers). In at least one example, the cryptographic identifier is a blockchain identifier. As used herein, a blockchain identifier is a unique identifier stored in a block (e.g., record) of a blockchain for a unique vehicle, wherein the blockchain identifier identifies a hardware assembly of the respective vehicle. Typically, the blockchain includes multiple cryptographic identifiers; however, this is not required. The cryptographic identifiers are securely memorialized by the blockchain and can be distributed among a number of stakeholder's systems. Accordingly, vehicle information may be distributed (via the blockchain) to other stakeholder's systems throughout a useful life of the vehicle 30 thereby increasing vehicle security while concurrently making the information more available.

Figure 1:
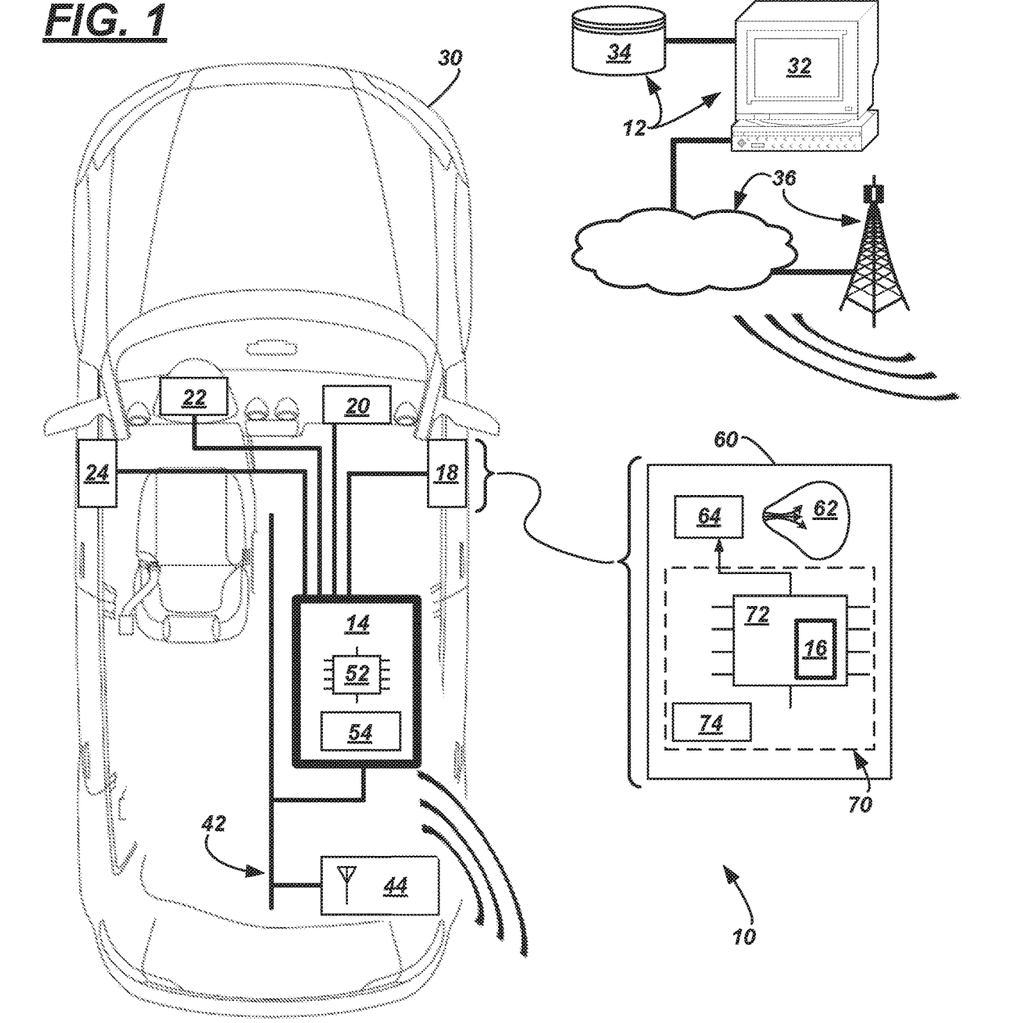
FIG. 1 is a schematic diagram illustrating a component validation system.

Computer 32 is any suitable computing hardware device used by the stakeholder's system 12—and the computer 32 may be configured to execute blockchain encryption. Database 34 is a storage medium which may comprise read-only memory (ROM), random-access memory (RAM), optical or magnetic disks, or the like. Typically, computer 32 is networked to a land and/or wireless network system 36—enabling long-range communication. Further computer 32 typically is networked to database 34 which stores the blockchain unique to vehicle 30, as well as the blockchains unique to potentially millions of other vehicles. Thus, e.g., when one of the stakeholder's systems—associated with vehicle 30—adds a block to the blockchain of vehicle 30, each of the stakeholder's systems receives the updated blockchain and can store it in its respective computer memory or storage device. For example, in such an instance, computer 32 updates the blockchain in database 34 while other stakeholder's systems (associated with vehicle 30) act similarly. Further, with regard to vehicle 30, such updating may occur repeatedly thereby increasing the length of the blockchain, as well as the blockchain's security.

The land and/or wireless network system 36 shown in FIG. 1: may enable connectivity to a public switched telephone network (PSTN) such as that used to provide hard-wired telephony, packet-switched data communications, internet infrastructure, and the like. It further may include satellite communication architecture and/or may include cellular telephone communication over wide geographic region(s). In at least one example, system 36 includes suitable cellular infrastructure that could include eNodeBs, serving gateways, base station transceivers, and the like (e.g., it may utilize any suitable existing or future cellular technology (e.g., including LTE, CDMA, GSM, etc.)). Network system 36 may utilize vehicle-to-vehicle (V2V) and/or vehicle-to-infrastructure (V2I) as well.

Turning now to the vehicle 30, FIG. 1 illustrates vehicle 30 as a passenger car; however, vehicle 30 could also be a truck, sports utility vehicle (SUV), recreational vehicle, bus, train car, aircraft, drone, or the like that includes computer 14 and at least one trusted execution environment (TEE). Among other things, vehicle 30 may comprise a communication network 42 to facilitate intra-vehicle communication between the computer 14, a telematics device 44, and the one or more hardware assemblies (e.g., such as assemblies 18-24) which each comprise a uniquely configured TEE (in FIG. 1, only one TEE 16 is shown).

Communication network 42 may include any suitable hardware adapted to facilitate wired and/or wireless communication between, among other things, computer 14, telematics unit 44, and hardware assemblies 18-24. According to one example, network 42 comprises a wired network such as a controller area network (CAN) bus, an Ethernet network, a Local Interconnect Network (LIN), a fiber optic connection, or the like. In the illustrated example, computer 14 and telematics device 44 may communicate via CAN, whereas computer 14 and each of assemblies 18-24 may communicate via LIN or other suitable discrete wired connection. Other examples also exist. For example, one or more of computer 14, telematics device 44, and assemblies 18-24 may communicate wirelessly via a wireless network 42—e.g., each of computer 14, device 44, and assemblies 18-24 may comprise a short-range wireless communication chipset (e.g., Bluetooth, Bluetooth Low Energy (BLE), Wi-Fi Direct, etc.) configured to send and/or receive wireless messages within the network 42. Still other implementations exist as well.

Computer 14 may be any computing hardware device configured to multi-factor authenticate at least one hardware assembly 18-24. In the illustrated example, computer 14 comprises a processor 52 and memory 54. Processor 52 can be any type of device capable of processing electronic instructions, non-limiting examples including a microprocessor, a microcontroller or controller, an application specific integrated circuit (ASIC), a field-programmable gate array (FPGA), etc.—just to name a few. In at least one example, the processor 52 is hardware programmed to execute a decryption algorithm and participate as a stakeholder's system of the blockchain (of vehicle 30). In at least one example, processor 52 is programmed to execute digitally-stored instructions, which may be stored in memory 54, which enable the computer 14, among other things, to: store a cryptographic identifier of the hardware assembly 18 (e.g., which, as explained below, may be a public key); transmit, to the hardware assembly 18, a validation message; then, receive a response message from the hardware assembly 18 (i.e., after the TEE 16 encrypts at least a portion of the validation message using a private key that corresponds with the public key); then, attempt to decrypt the response message using the cryptographic identifier; and then, authenticate the hardware assembly or determine that it is not authenticated (e.g., it is counterfeit or missing).

Memory 54 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 54 may store one or more computer program products which may be embodied as software, firmware, or other programming instructions executable by the processor 52.

In the illustrated example, computer 14 is a restraint control module coupled to a plurality of airbag assemblies (e.g., assemblies 18-24). However, this is merely an example, and as will be apparent from the description below, other examples exist.

As described above, computer 14 may be communicatively coupled to one or more hardware assemblies 18-24. As used herein, each hardware assembly 18-24 includes a physical component and computer hardware comprising a trusted execution environment (TEE), the computer hardware being adapted to communicate with computer 14 (and more particularly, with processor 52). The physical component is typically the target of thieves, and the computer hardware is used to detect theft, as described more below. In one example, each of hardware assemblies 18-24 are airbag assemblies; e.g., an airbag and inflator may comprise the physical component which is the target of thieves. Other non-limiting examples of hardware assemblies include a camera assembly, a light detection and ranging (LIDAR) sensor, a vehicle infotainment assembly, a GPS assembly, a tailgate assembly, a car emblem or logo assembly, a wheel assembly, a catalytic converter assembly, a braking system assembly, a steering system assembly, a vehicle lighting system assembly, a powertrain control assembly, and the like. Since in the illustrated example, each hardware assembly 18-24 may be similar or identical (airbag assemblies), only one assembly (e.g., 18) will be described in detail herein.

As shown in FIG. 1, hardware assembly 18 comprises a housing 60, an airbag 62, an inflator 64, and a computer 70 comprising a processor 72 and memory 74, wherein a portion of the processor 72 is logically partitioned to include the trusted execution environment (TEE) 16. Housing 60 may be any suitable enclosure to carry airbag 62, inflator 64, and computer 70. Airbag 62, as used herein, is an inflatable bag adapted to cushion a vehicle occupant during a collision event. And inflator 64, as used herein, is a device which, when triggered, expels a fluid into the airbag 62 thereby causing the airbag 62 to inflate. In this example, the airbag 62 and inflator 64 may represent the physical component targeted by thieves.

Computer 70 may have any suitable processing and/or memory capability. In at least one example, processor 72 is an ASIC or FPGA that is programmed to receive a validation message (e.g., from computer 14) via communication network 42 and digitally sign the message using a private cryptographic key (hereafter referred to as a private key). Thereafter, processor 72 may return the message to the sender (e.g., computer 14)—which uses the digitally signed message to perform multi-factor authentication. Processor 72 is at least logically partitioned to comprise the TEE 16. In some examples, TEE 16 also may be physically partitioned within the processor 72 as well.

Figure 2:
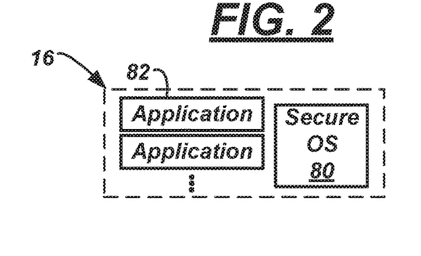
FIG. 2 is a schematic diagram of a trusted execution environment (TEE) of a vehicle hardware assembly.

FIG. 2 illustrates a schematic diagram of the TEE 16. As used herein, a trusted execution environment (TEE) is an isolated processing environment (i.e., hardware) within processor 72 (and which TEE further is part of hardware assembly 18). TEE 16 can operate in parallel with other operations of processor 72. The TEE 16 may comprise a secure operating system (OS) 80 and one or more TEE applications 82. While TEE 16 may utilize secure OS 80, TEE 16 may be able to utilize the full power of processor 72 and/or memory 74. As used herein, a TEE application is a set of instructions which are logically isolated from other applications (i.e., non-TEE applications which may be executed by the processor 72). In some instances, each TEE application 82 may be logically isolated from one other—e.g., using software, cryptographic techniques, and/or the like.

According to one exemplary implementation, TEE 16 comprises at least one application 82. The TEE application 82 may comprise instructions to: store a private key, receive a validation message from computer 14 (via processor 72), digitally sign the validation message using the private key, and output the digitally signed message (to the processor 72, which in turn sends the digitally signed message to computer 14).

Turning now to the telematics device shown in FIG. 1, telematics device 44 may be any suitable telematics computing device configured to wirelessly communicate with other remotely-located electronic devices—e.g., such as the stakeholder's system 12. Such wireless communication via telematics device 44 may include use of cellular technology (e.g., LTE, GSM, CDMA, and/or other cellular communication protocols), short range wireless communication technology (e.g., using Wi-Fi, Bluetooth, Bluetooth Low Energy (BLE), dedicated short range communication (DSRC), and/or other short range wireless communication protocols), or a combination thereof. Such communication includes so-called vehicle-to-vehicle (V2V) and vehicle-to-infrastructure (V2I) communications as well—all of which will be appreciated by those skilled in the art.

Figure 3:
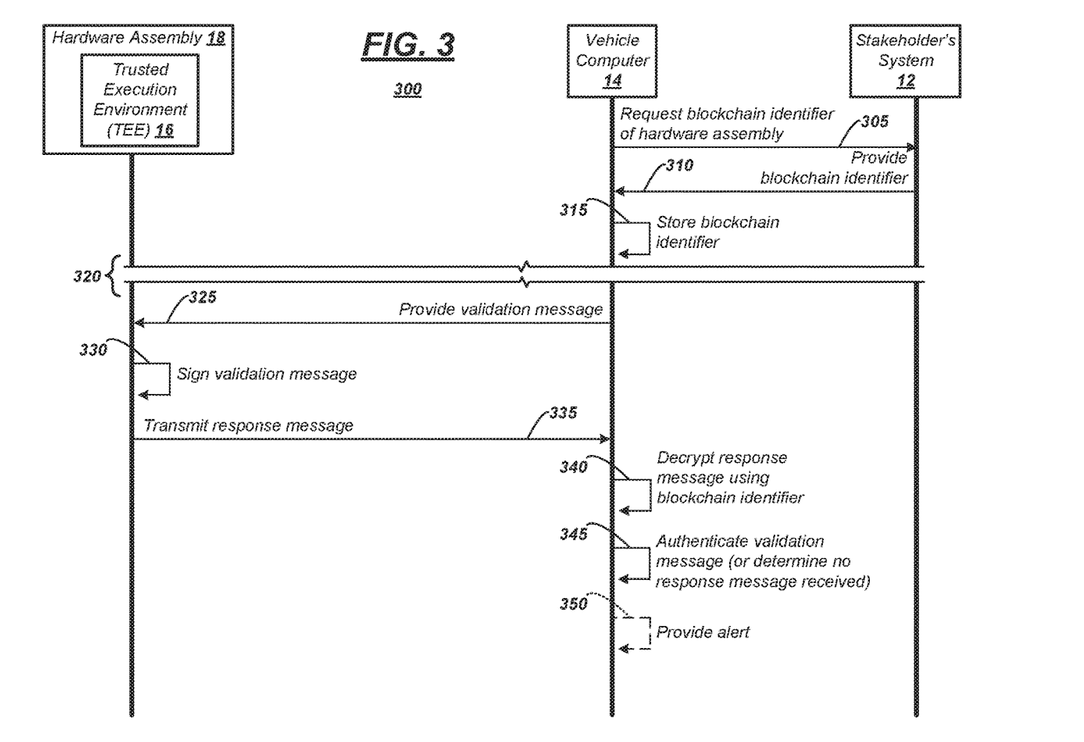
FIG. 3 is a flow diagram illustrating an illustrative multi-factor authentication process.

Turning now to FIG. 3, a flow diagram is shown to illustrate how a multi-factor authentication process 300 may be carried out using the component validation system 10. For explanatory purposes only—and not to be limiting—process 300 will be described in the context of hardware assembly 18 being an airbag assembly.

In step 305, computer 14 may transmit to stakeholder's system 12 (via telematics device 44 and land and/or wireless network system 36) a request (e.g., a query) for a unique cryptographic identifier of an airbag hardware assembly 18. Stakeholder's system 12 may receive the request, and in step 310 (in response), stakeholder's system 12 may provide the cryptographic identifier (again, via land and/or wireless network system 36 and telematics device 44). In at least one example, the cryptographic identifier is a public cryptographic key (hereafter, public key) that corresponds with a private key stored within the TEE 16 of assembly 18. Further, the stakeholder's system 12 may retrieve the cryptographic identifier from a blockchain that contains other unique cryptographic identifiers associated with other respective hardware assemblies within the specific vehicle 30.

According to at least one example, computer 14 is a stakeholder's system as well. In this example, steps 305 and 310 may be omitted and computer 14 instead may access its unique blockchain and identify the public key associated with assembly 18. For example, computer 14 may store the most recent version of its blockchain locally, or computer 14 (via telematics device 44) may update its copy of the blockchain by requesting the blockchain (comprising identifiers of its hardware assemblies) from a remote server or database (e.g., such as database 34).

Regardless of which technique the computer 14 acquires the unique cryptographic identifier of hardware assembly 18, in step 315, computer 14 stores the cryptographic identifier in memory 54.

FIG. 3 illustrates that a span of time 320 may exist between steps 315 and 325. Time 320 may be any suitable duration. Furthermore, in at least one example, any of steps 305-315 may occur after steps 325, 330, and/or 335 (which are explained below).

In step 325, computer 14 transmits a validation message to the hardware assembly 18. Step 325 may be triggered by any suitable detection by computer 14. For example, the trigger may be storing the cryptographic identifier in memory 54. Or the trigger may be a duration of clock time, a duration of engine RUN time, a quantity of ignition cycles, or the like. In at least one example, step 325 is triggered following automotive service or maintenance of vehicle 30. For example, since some automotive component theft can occur at an unauthorized service station, computer 14 may execute step 325 (and any of steps 330-355) following disconnection of vehicle battery power or other detectable maintenance operation.

According to one illustrative example, the validation message may be transmitted to processor 72 (of assembly 18) via communication network 42—e.g., via LIN from computer 14 to hardware assembly 18. The validation message may comprise a tag that identifies the message as a validation message. Further, processor 72 may include a set of instructions that enable it to determine that the message from computer 14 is a validation message (e.g., as opposed to a message to deploy airbag 62). Thus, in response to receiving the validation message having the tag, processor 72 may pass the validation message to TEE 16.

The validation message may be any suitable type and quantity of data. In one example, the validation message is a timestamp. In another example, the validation message is a code. In one example, the validation message is an identifier (e.g., VIN, serial number, etc.). Other examples exist as well.

In step 330, TEE 16 may receive the validation message and—using its secure OS 80—digitally sign the validation message with its private key—e.g., producing an encrypted message (e.g., a so-called hash). The TEE 16 then may provide the encrypted message to the processor 72.

In step 335, which follows, processor 72 may transmit a response message (that includes the encrypted message) to computer 14 (e.g., again via communication network 42). Thus, the response message may be transmitted in response to receipt of the validation message in step 325.

In step 340, computer 14 (and more particularly processor 52) may decrypt the response message using the cryptographic identifier (e.g., the public key) obtained via the blockchain that uniquely comprises cryptographic identifiers of hardware assemblies in vehicle 30.

In step 345, computer 14 may compare the decrypted response message (of step 340) with the validation message it sent to assembly 18 (in step 325). In this instance, if the two messages match, then computer 14 may determine that the assembly 18 is authenticated; i.e., the computer 14 may determine that assembly 18 has not been tampered with, has not replaced without authorization, and is not counterfeit.

In step 350, computer 14 may provide an alert based on the authentication. For example, computer 14—via telematics device 44 and land and/or wireless network system 36—may send an alert to stakeholder's system 12 and/or add a new block to its unique vehicle blockchain (e.g., that records the authentication, a timestamp, and/or the like).

In some examples of step 345, the decrypted response message (of step 340 and the validation message (of step 325) may not match. In this instance, computer 14 may determine that the hardware assembly 18 is not authentic. And in block 350, computer 14 may provide an alert to that effect. The alert may notify a user of the vehicle 30 and/or one or more stakeholder's systems. For example, the alert may be a visible and/or audible alert to the user (e.g., indicating a potential theft).

In some examples, no response message (step 335) may be transmitted to and/or received by computer 14. In such instances, step 340 may be skipped and step 345 may include determining no response message received (e.g., within a predetermined period of time). In such instances, computer 14 may resend the validation message and re-await the response message. Alternatively, or in addition thereto, computer 14 may proceed to step 350 and provide an alert as discussed above.

Thus, using process 300, computer 14 may perform a multi-factor authentication of hardware assembly 18. As described above, two or more sources must provide information that identifies the authenticity of hardware assembly 18: a blockchain record (e.g., comprising the cryptographic identifier) and the digital signature of TEE 16.

Other authentication process examples exist as well. For example, if perchance vehicle 30 receives authorized service and the airbag hardware assembly 18 is replaced with a new and authentic assembly, then a stakeholder's system (such as the authorized repair facility) may add a new block in blockchain of vehicle 30—e.g., the new block including a record that comprises a new, updated cryptographic identifier for the respective assembly 18. Thus, when process 300 is repeated, computer 14 may receive the updated cryptographic identifier and be able to authenticate the hardware assembly. In this manner, the process 300 may be repeated as desired even when authorized maintenance and repair occur.

It should be appreciated that all or at least some of the steps set forth above may be computer-executable instructions which may be carried out by computer 14, processor 72, TEE 16, stakeholder's system 12, or a combination thereof. These instructions may be embodied as software, firmware, or any other suitable code.

It further should be appreciated that computer 14 is physically partitioned (e.g., isolated with respect to hardware) from the hardware assembly 18. In this manner, an independent source (e.g., computer 14) authenticates whether the hardware assembly is authentic—e.g., as opposed to the hardware assembly 18 attempting to authenticate itself—the latter being subject to manipulation by hackers and other malicious entities.

Thus, there has been described a multi-factor authentication process for authenticating a hardware assembly in a vehicle. The system can include a stakeholder's system participating in a blockchain, a computer in a vehicle, and a hardware assembly (in the vehicle) having a trusted execution environment (TEE). The computer may authenticate the hardware assembly using secure information from both the blockchain and the TEE. In this manner, theft of the hardware assembly can be detected, even if the thief replaced the stolen assembly with a counterfeit assembly.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising: a hardware assembly in a vehicle, comprising: a trusted execution environment (TEE); and a computer in the vehicle and communicatively coupled to the hardware assembly, the computer comprising a processor programmed to execute instructions to determine whether the hardware assembly is or is not counterfeit hardware assembly, the instructions comprising to: store a cryptographic identifier of the hardware assembly; transmit, to the hardware assembly, a validation message; then, receive a response message; then, authenticate a first factor regarding the hardware assembly by decrypting the response message using the cryptographic identifier; determine that the hardware assembly is not a counterfeit hardware assembly by authenticating a second factor regarding the hardware assembly by determining that the cryptographic identifier is part of a blockchain identifier of the hardware assembly, upon authenticating the first factor and the second factor, record the authentication of the hardware assembly in a block of a blockchain that includes the cryptographic identifier of the hardware assembly and a vehicle identifier; and then distribute, via a network, the blockchain, including the block that includes the cryptographic identifier of the hardware assembly and the vehicle identifier, to one or more remote computers associated with a respective entity that has permission to add additional blocks to the blockchain; wherein the hardware assembly is an airbag assembly.

2. The system of claim 1, wherein the TEE stores a private key.

3. The system of claim 2, wherein the TEE is programmed to: digitally sign the validation message.

4. The system of claim 1, wherein the identifier is a public key that corresponds with a private key stored in the TEE.

5. The system of claim 1, the instructions further comprising, to: query a stakeholder's system for the blockchain identifier.

6. The system of claim 1, wherein the computer is a stakeholder's system associated with a blockchain and the blockchain identifier, wherein the blockchain comprises a plurality of cryptographic identifiers which each uniquely identify a different hardware assembly in a vehicle.

7. The system of claim 1, the instructions further comprising: following authorized vehicle repair, use an updated cryptographic identifier and repeat the instructions to store, transmit, receive, decrypt, and authenticate the first and second factors.

8. The system of claim 1, wherein the remote computer comprises a processor programmed to execute instructions to authenticate the hardware assembly in the vehicle based on the block including the cryptographic identifier of the hardware assembly and the vehicle identifier.

9. A method, comprising: storing, at a computer in a vehicle, a cryptographic identifier of a vehicle hardware assembly, wherein the vehicle hardware assembly is an airbag assembly; transmitting, from the computer to the vehicle hardware assembly, a validation message; then, receiving, at the computer, a response message; then, authenticating a first factor regarding the vehicle hardware assembly by decrypting the response message using the cryptographic identifier; and then, determining that the hardware assembly is not a counterfeit hardware assembly by authenticating a second factor regarding the vehicle hardware assembly by determining that the cryptographic identifier is part of a blockchain identifier of the vehicle hardware assembly; upon authenticating the first factor and the second factor, recording the authentication of the hardware assembly in a block of a blockchain that includes the cryptographic identifier of the hardware assembly and a vehicle identifier; then distributing, via a network, the blockchain, including the block that includes the cryptographic identifier of the hardware assembly and the vehicle identifier, to one or more remote computers associated with a respective entity that has permission to add additional blocks to the blockchain.

10. The method of claim 9, wherein the assembly comprises a trusted execution environment (TEE), wherein the TEE stores a private key.

11. The method of claim 9, wherein the response message comprises a digital signature of at least a portion of the validation message.

12. The method of claim 9, wherein at least a portion of the blockchain identifier is a public key that corresponds with a private key used to encrypt the response message.

13. The method of claim 9, further comprising: requesting, from a stakeholder's system, the blockchain identifier.

14. The method of claim 13, wherein the stakeholder's system comprises the computer or a remote server.

15. The method of claim 13, further comprising repeating the decrypting using an updated cryptographic identifier.

16. The method of claim 9, further comprising: determining that the assembly is authenticated; and adding a block to a blockchain that records the authentication.

17. The method of claim 9, further comprising, authenticating, in the remote computer, the hardware assembly in the vehicle based on the block including the cryptographic identifier of the hardware assembly and the vehicle identifier.

18. A system, comprising: a hardware assembly in a vehicle, comprising: a first processor, and a trusted execution environment (TEE) within the first processor, wherein the first processor is programmed to receive a validation message, and pass the validation message to the TEE, wherein the TEE is programmed to digitally sign at least a portion of the validation message and return, to the first processor, an encrypted response message; wherein the hardware assembly is an airbag assembly; and a computer in the vehicle and communicatively coupled to the hardware assembly, the computer comprising a second processor and memory storing instructions executable by the second processor to determine whether the hardware assembly is or is not counterfeit hardware assembly, the instructions comprising to: store a cryptographic identifier of the assembly; transmit, to the first processor, the validation message; then, determine whether a response message is received from the first processor; when the response message is received, then: authenticate a first factor regarding the hardware assembly by decrypting the response message using the cryptographic identifier; and then, determine that the hardware assembly is not a counterfeit hardware assembly by authenticating a second factor regarding the hardware assembly by determining that the cryptographic identifier is part of a blockchain identifier of the hardware assembly; upon authenticating the first factor and the second factor, record the authentication of the hardware assembly in a block of a blockchain that includes the cryptographic identifier of the hardware assembly and a vehicle identifier; then distribute, via a network, the blockchain, including the block that includes the cryptographic identifier of the hardware assembly and the vehicle identifier, to one or more remote computers associated with a respective entity that has permission to add additional blocks to the blockchain; and when the response message is not received, then: determine that the hardware assembly is not authenticated.

19. The system of claim 18, the instructions further comprising to: when the assembly is not authenticated, provide an alert.

20. The system of claim 18, wherein the remote computer comprises a processor programmed to execute instructions to authenticate the hardware assembly in the vehicle based on the block including the cryptographic identifier of the hardware assembly and the vehicle identifier.

\* \* \* \* \*